United States Patent [19]
Cookston

[11] 3,882,978
[45] May 13, 1975

[54] TROLLEY MULTI-CONDUCTOR SYSTEM

[76] Inventor: Arthur M. Cookston, 1340 Watson Ave., Costa Mesa, Calif. 92626

[22] Filed: May 3, 1974

[21] Appl. No.: 466,811

[52] U.S. Cl. ................... 191/32; 191/29 R; 191/40
[51] Int. Cl. ............................................. B60m 1/30
[58] Field of Search ............ 191/22 R, 23 R, 25, 28, 191/29 R, 30, 31, 32, 33 R, 35, 40, 44, 44.1; 248/49, 58, 68 R; 174/68 R, 68 B, 72 R, 113 R, 194, 201

[56] References Cited
UNITED STATES PATENTS

| | | | |
|---|---|---|---|
| 2,912,526 | 11/1959 | Herrmann | 191/35 |
| 3,337,697 | 8/1967 | Martin | 191/40 |
| 3,439,131 | 4/1969 | Ross | 191/25 |

Primary Examiner—M. Henson Wood, Jr.
Assistant Examiner—D. W. Keen

[57] ABSTRACT

A trolley multi-conductor system is disclosed with novel support means wherein each current conductor is rigid and made into sections of predetermined length and two or more such sections are preassembled to form a sub-assembly unit containing at least two parallelly disposed conductor sections of equal length. The two sections are fixed together by two spaced rigid insulating bars, transversely disposed with respect to the conductor sections. The support means includes a plurality of support members disposed in predetermined, spaced apart, overhead positions. Each support member has means to cooperate with respective means on each insulation bar to allow clamping the respective support members and bars together.

13 Claims, 13 Drawing Figures

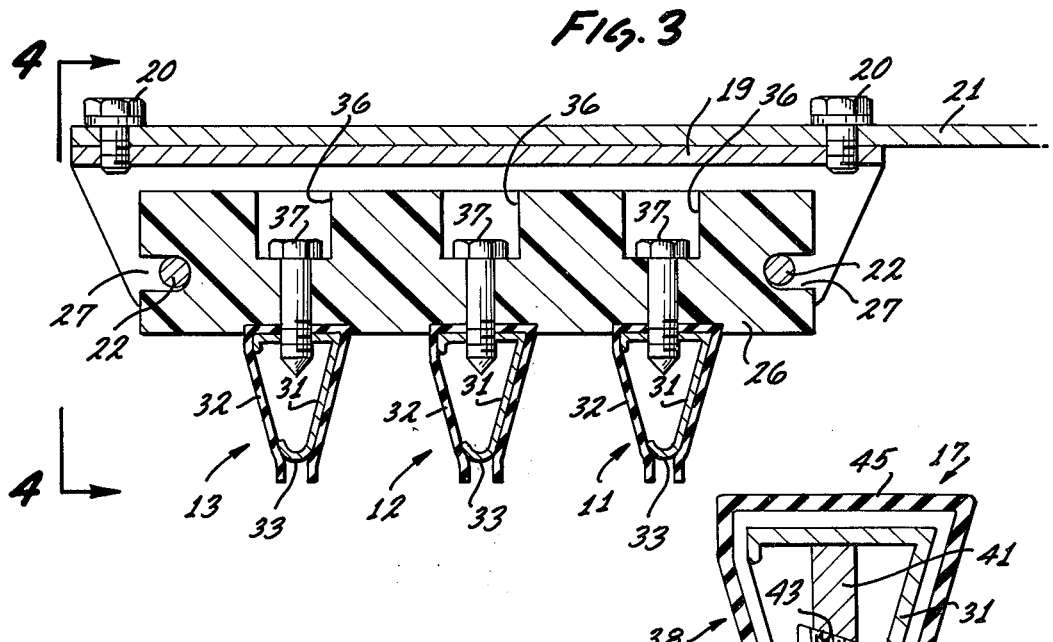
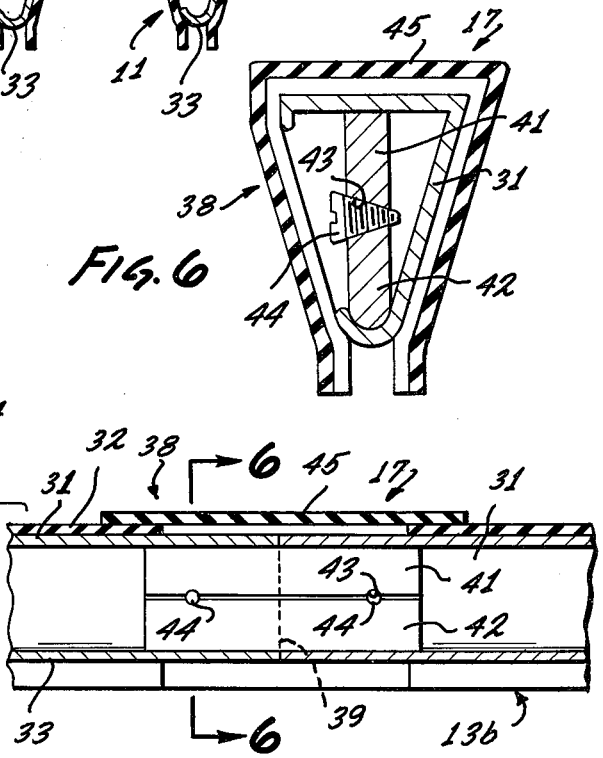
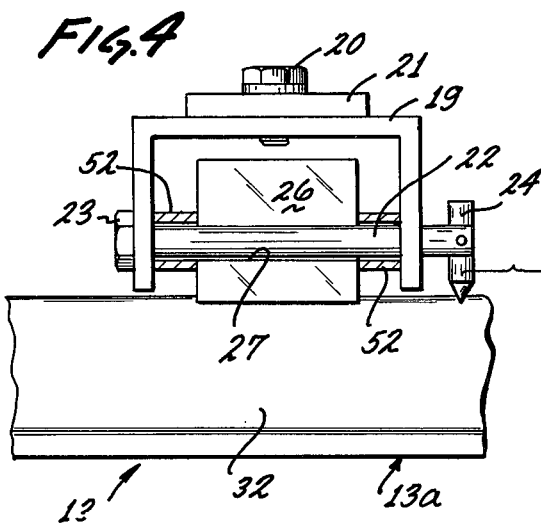
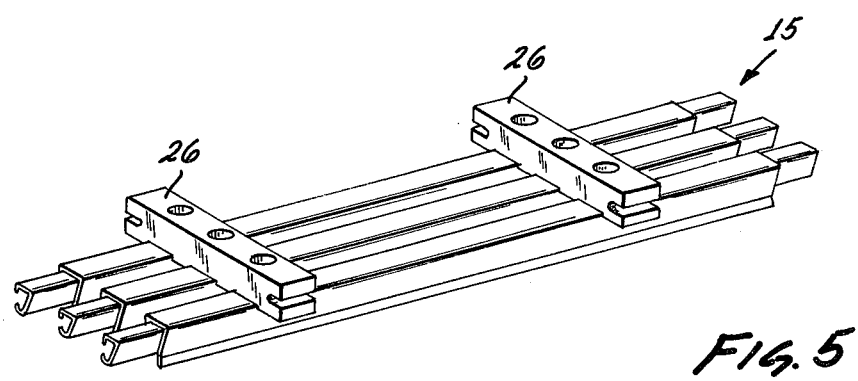

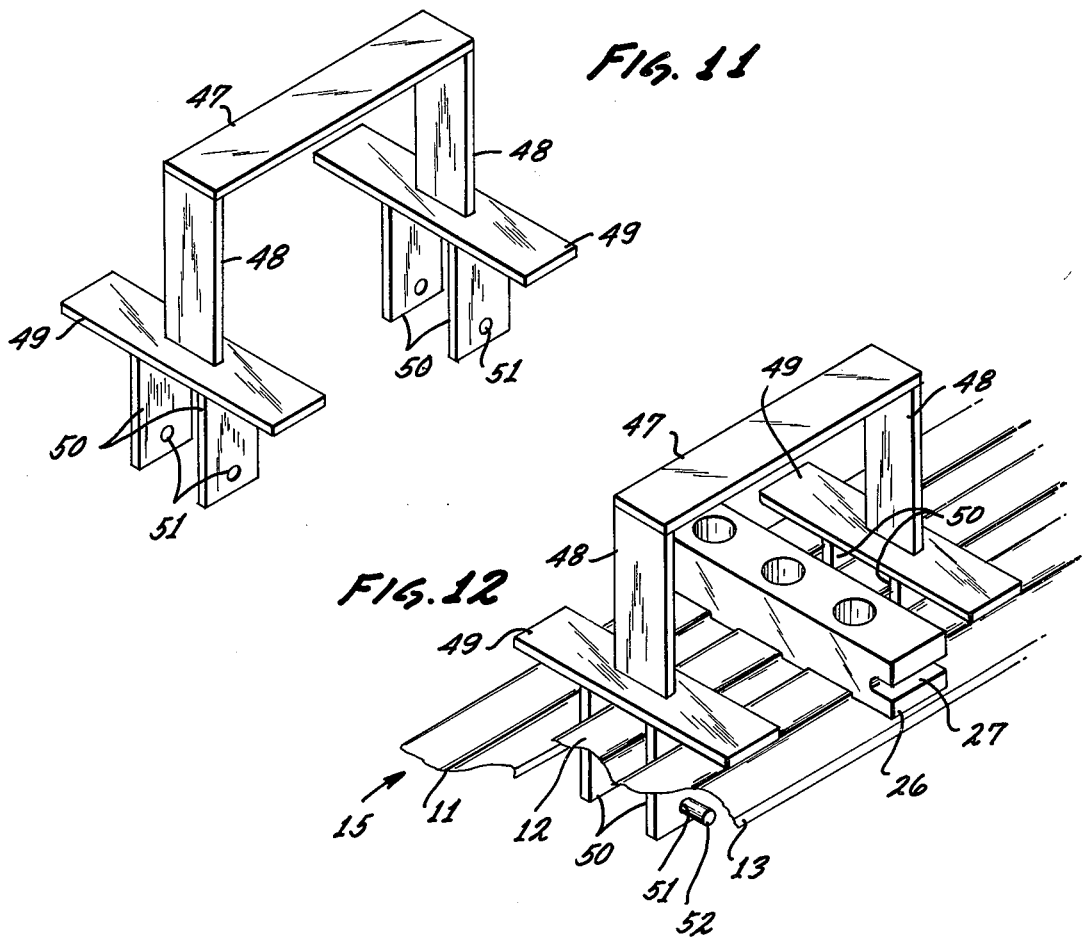
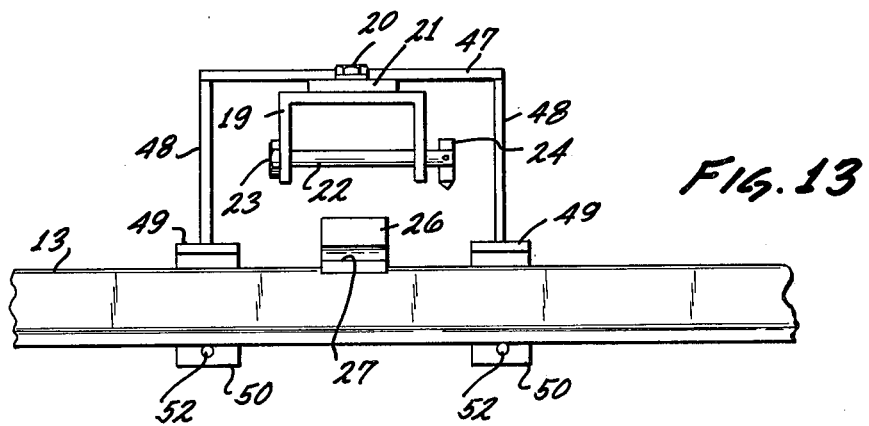

TROLLEY MULTI-CONDUCTOR SYSTEM

FIELD OF THE INVENTION

This invention relates to a trolley multi-conductor system and, more particularly, to a support means that supports multi-conductors in parallel relationship for an electrified material handling system.

BACKGROUND OF THE INVENTION

The prior art teaches many types of support means for supporting electrical conductors for a trolley system. As everyone knows, a trolley is an apparatus for collecting electric current from an overhead wire, and transmitting the current to a motor on a moving vehicle. However, support means of the prior art require that a person fix each conductor or wire separately thereto. Typical prior art systems are disclosed in U.S. Pat. Nos. 3,231,850; 3,249,704; and 2,881,271. Although the latter patent teaches a support for fixedly mounting two conductors together and also to a support member, four loose units comprising the two conductors and two clamping members must be fixedly mounted to a fixed support in one operation. One can see that this is a very laborious operation, especially in an overhead position, as one must manhandle two free conductors and two free clamping members in order to mount the conductors to the fixed support, while stationed several feet above the ground.

OBJECTS OF THE INVENTION

An object of this invention is to provide an improved, simple support means for a trolley multi-conductor system which means allows the system to be more easily installed.

Another object of this invention is to provide a preassembled unit containing at least two conductor sections disposed side by side, with means for readily fixing said unit to one or more fixed supports.

Another object of this invention is to provide a pair of insulators to each of which are fixed at least two lengths of conductor sections, and to provide fixed support means to which each insulator is adapted to be mounted.

These and other objects and features of advantage will become more apparent to one skilled in the art after studying the following detailed description of my invention, together with the appended drawings.

BRIEF DESCRIPTION OF THE DRAWINGS

FIG. 3 is a section taken in the vertical plane, containing line 3—3 of FIG. 2 and viewed in the direction of the arrows.

FIG. 4 is an elevation taken on line 4—4 of FIG. 3 and in the direction of the arrows, also showing, in section, a conductor-section coupling means.

FIG. 5 is a pictorial view of a three conductor subassembly unit before being installed into the system.

FIG. 6 is a section taken on line 6—6 of FIG. 4 in the direction of the arrows.

FIG. 11 is a pictorial view of a tool to assist in assembling the novel conductor assembly unit to the fixed support.

FIG. 12 is a pictorial of the tool of FIG. 11, coupled to the novel conductor assembly unit.

FIG. 13 is an elevation view taken on line 4—4 of FIG. 3, showing the novel conductor unit assembly just before being made fast to the fixed support.

DETAILED DESCRIPTION OF THE DRAWING

Figure 1:
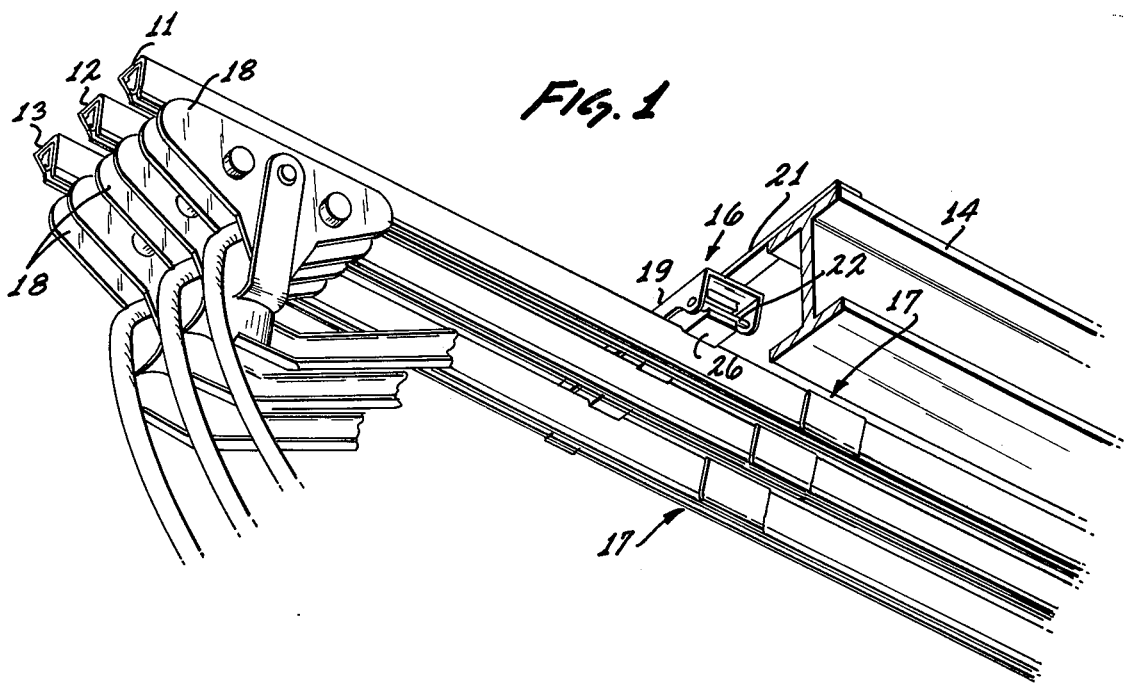
FIG. 1 is a pictorial view looking up at a typical three conductor overhead trolley system, including my novel support means for the three conductors.

Referring, in particular, to FIG. 1, there is shown a typical 3-wire trolley conductor system, consisting of three parallel shielded conductors 11, 12 and 13, anchored preferably overhead to a fixed I-beam 14 by my novel support means 16. Means 16 are spaced apart along the three-wire conductor system, as will become apparent hereinafter. Each shielded conductor of the three-wire system is coupled to an adjacent shielded conductor by a splicing or coupling means 17. Suitable current collectors 18, as disclosed in U.S. Pat. No. 3,231,850, are used to collect current and transmit it to a place of use.

Figure 2:
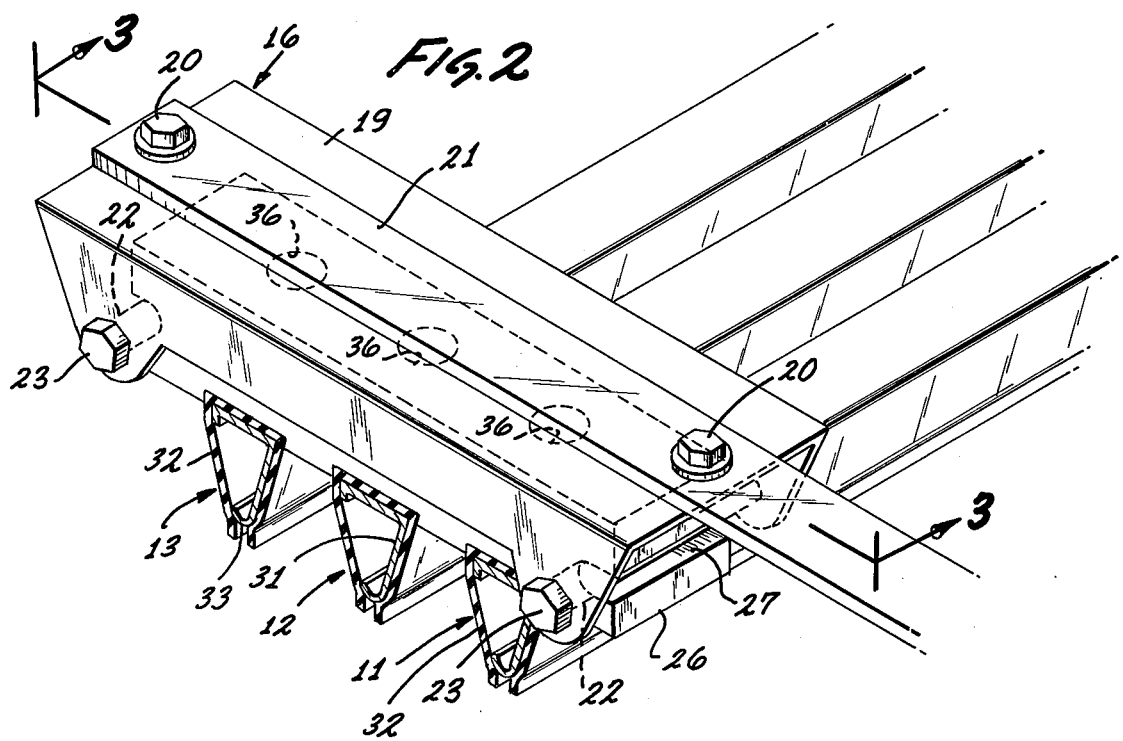
FIG. 2 is an enlarged pictorial view, looking down on one of my novel support means of FIG. 1.

Referring to FIGS. 2, 3, and 4, my novel support means 16 is shown in greater detail. Means 16 has two parts: a mounting means and an insulating bar means, each of which includes means for securing the two together. The mounting means is preferably a channel-shaped support member 19, which is fixed to an overhead position by bolts 20, bolting the member 19 by its web, to respective cantilevered iron bars 21, fixed or welded by one end to the I-beam 14, as shown in FIG. 1, so that the two flanges of member 19 depend downwardly and are disposed transversely to the conductors. Each support member 19 has a pair of quick-disconnect pins 22 disposed one at each end, as shown. Pins 22 are of the standard type which have a head 23 on one end and at the other end pivotal toggle 24 that pivots due to gravity to a position normal to the body of the pin 22, thereby securing the pin, as shown in FIG. 4. Each pair of pins 22 secures a respective insulation bar means, each of which comprises a bar 26, by allowing each pin 22 to nest within a respective groove 27 formed one at each end of the bar 26. The three shielded conductors 11, 12 and 13 are mounted to the underside of the bar 26. Each shielded conductor has a metallic conductor 31, shaped like a numeral seven, with the bottom of each conductor formed semi-cylindrical in order for the current collector 18 to function properly. Almost completely surrounding each conductor 31 is a plastic insulating sheath 32, each of which is somewhat U-shaped in cross-section and surrounds or covers substantially the respective conductor 31, except for a curved surface 33 on which rides the current collectors 18. The purpose of the sheath 32 is to prevent accidental touching of the high voltage across the conductors. The bars 26 are provided with three counter-bored holes 36, through each of which a self-tapping bolt 37 is disposed to engage the horizontal planer portion of the respective conductors 31. Since the conductors are metal, at least one-sixteenth of an inch thick, the self-tapping bolts 37 readily engage the conductors. This arrangement for the support of conductors 31 allows one to use a sheath 32 thinner than the prior art allows, as no grounded metal is disposed on the opposite side of the particular sheath from the conductor 31. Although the bolts 37 are at the same potential as the respective conductors, the counterbored holes 36 provide sufficient spacing between the bolts and the channel support member 19, which can be made inexpensively out of iron and can be grounded. If need be, each hole 36 could be filled with a plastic for greater insulation safety.

To efficiently utilize the features of advantage of my novel means 16, the shielded conductors 11, 12 and 13 are made into sections of predetermined length, and three such sections are mounted to a pair of bars 26 to form a sub-assembly unit 15, as shown in FIG. 5. The sub-assemblies are preferably of varying lengths, for example, 7, 10, 15 and 20 feet long, for reasons that will become apparent hereinafter. Preferably, the spacing between each pair of brackets or bars 26 on one unit 15 should be approximately half the length of the unit and both bars equally spaced from the respective ends. In other words, referring to FIG. 4, wherein one end of one shielded conductor section 13a of, for example, shielded conductor 13 is shown coupled by a splicing means 38 to one end of an adjacent conductor section 13b, the distance between the splicing means 38 and the adjacent bar 36 is approximately one-fourth the length of the respective unit 15. The advantage of this arrangement of the sub-assemblies will become more apparent in the description of the method of installing this system, to be described hereinafter.

The splicing means 38 for the particular conductors 31 will now be described. FIrst, the insulation sheet for each conductor section terminates a predetermined space from the ends of each conductor 31, as shown in FIG. 4, for units 15 containing conductors 13a and 13b. The two metallic conductors 31 each have their ends butted together as at line 39. Disposed across the line 39 representing the ends, two short bars 41 and 42 are placed, one over the other, as better shown in FIG. 6. Of course, bar 41 has a flat surface where it makes contact with the top of conductor 31, and bar 42 has a rounded surface which makes contact on the opposite side of surface 33 both conductors. Each bar 41 and 42 has formed therein a pair of half-threaded taper holes in each of which is threaded a matching threaded taper screw 44. As shown in the drawing, preferably two screws 44 and holes 43 are used. In practice, the taper may not be as pronounced as shown. Two tapered holes 43 are formed in each pair of bars 41 and 42. Now, when the screws 44 are tightened, the bars 41 and 42 tend to separate and bind against both conductors on each side of line 39, thereby fixing the ends together. To increase safety, a joint insulation cover member 45 is slipped over the exposed portion of conductors 31, and overlaps both sheaths 32.

Referring to FIGS. 11, 12, and 13, the method of installing the system is shown. First the system is designed and one determines the place and extent that the three shielded conductors 11, 12, and 13 are to be positioned. The number, size and position of sub-assembly units 15 are determined. The position of the iron bars 21 then can be determined and welded to the building structure or, as illustrated in FIG. 1, are welded to I-beam 14. The support members 19, together with pins 22, are bolted to the respective bars 21. The various sub-assembly units 15 are positioned on the ground directly below their overhead position. Now, one takes a pair of tools, such as the one shown in FIG. 11. The tool shown is made, preferably of 1 inch by ¼ inch steel bar stock, and has a U-shaped handle with a horizontal member 47 having depended therefrom a pair of vertical members 48, one at each end. To each vertical member 48 is welded a transverse member 49 and each of which has depending therefrom a pair of spaced securing members 50. The space between the pair of members 50 on one member 49 is sufficient to allow the center shielded conductor 12 to slip therebetween, as shown in FIG. 12. The tool is set, as shown, to straddle an insulating bar 26, one at each end of the respective sub-assembly unit 15. Members 50 each have a hole 51 that is so positioned to receive dowels 52, one for each pair of members 50. The dowels 52 are below the center shielded conductor 12. A person can grab member 47, walk up a ladder (not shown) and slip member 47 over the respective bar 21, as shown in FIG. 13. He then moves his ladder to the other end of the sub-assembly unit 15 and lifts the other tool by member 47 and slips that over the respective bar 21. One should preferably start at the center of the system and work to the opposite ends. With the sub-assembly unit 15 and the respective pair of tools positioned, as shown in FIG. 12, the installer walks up a ladder, removes the outside pin 22 of the support member 19, slips the remote groove 27 in the bar 26 over the remaining pin and re-installs the removed pin 22, making sure that it engages the respective groove 27. This is repeated on both ends.

In normal practice, the sub-assembly unit 15, at the center of the run, is fixed at one bar 26. The other bar thereof and the bars 26 on the remaining sub-assembly units 15 are made free to slide on the pins 22 to allow for thermal expansion. The one fixed bar of the respective sub-assembly unit 15 is fixed, as shown in FIG. 4, by providing bushings 52 around each of the pins 22 on opposite sides of the bar 26. SInce the support member 19 is made several inches longer between its flanges than the width of the bar 26, the bushings 52 are of such a length as to lock in place the particular bar 26. The other bars 26 are free to slide horizontally. After each sub-assembly unit 15 is installed, the conductors are spliced, as described above, and the cover member 45 is slipped in place.

Figure 7:
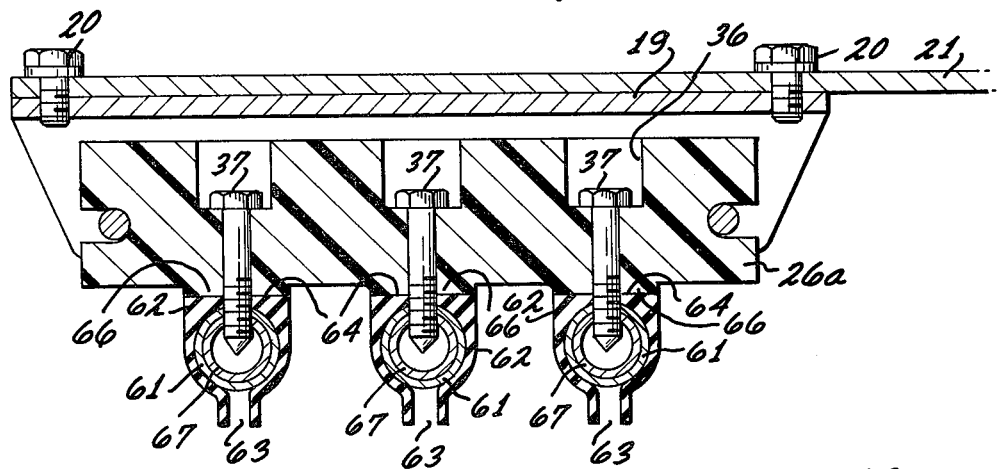
FIG. 7 is another section, similar to FIG. 3, showing another embodiment of electrical conductors incorporated with my invention.
Figure 8:
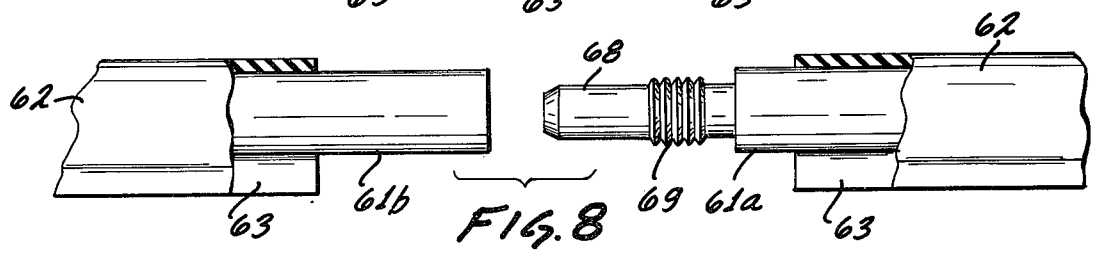
FIG. 8 is an exploded elevation view of one of the conductors of FIG. 7, showing the details of the coupling means for these conductors.
Figure 9:
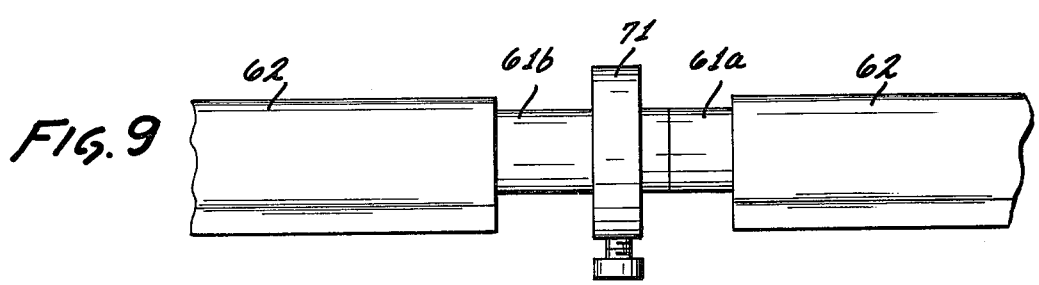
FIG. 9 is an assembled elevation of the conductors of FIG. 8, showing a means for securing the two conductor sections.

Having described my invention with one type of metallic conductors, such as conductors 31, FIGS. 7, 8, and 9 shown my invention with another type of a metallic conductor, which are cylindrical tube-type conductors 61. These conductors 61 should also be made a predetermined length, covered with an insulation sheath 62, also having a U-shaped cross-section. However, on the side of the sheath 62, opposite an open slit 63, the sheaths 62 have a flat surface 64, which lie adjacent to the bracket or bar 26a, which is similar to bar 26, but has three ridges 66 on which a respective conductor is mounted. Again, the self-tapping bolts 37 are used to secure the conductors in place. To strengthen the conductors 61, where the bolts 37 are engaging a short length of tubing 67, for example 4 inches long, is placed in way of the bolts and within the conductor so that respective bolt 37 also engages the respective tubing 67. Conductors 61 also being of specific lengths are to be spliced end to end, the splicing means being shown in FIG. 8, and includes a dowel 68 protruding from only one end of conductor 61a. The other end is open, as shown for conductor 61b. The sheaths 62 terminate a predetermined space from the ends, as shown. The dowel 68 has formed thereon circumferential grooves and ridges 69. The exposed ends of the dowel 68 are slipped into the open end of the adjacent conductor 61b, and a standard tool 71 is used to swage the conductors 61b down on the dowel 68 so that the grooves and ridges 69 form a strong bond. A suitable cover sheet (not shown), is placed over the splice.

Figure 10:
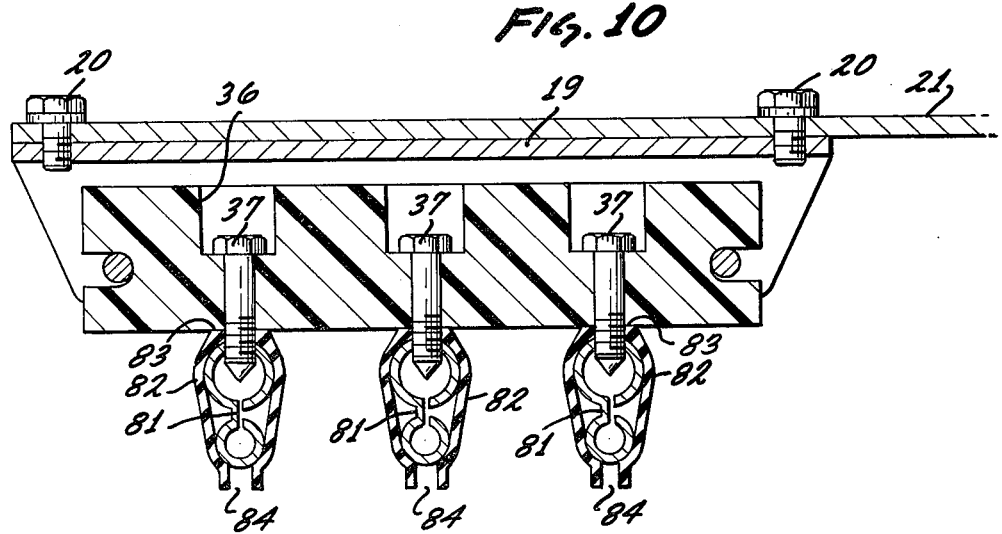
FIG. 10 is another section, similar to FIG. 3, showing prior art conductors incorporated with my invention.

In FIG. 10, another type of conductors 81 are shown, in cooperation with my invention. Conductors 81 have a numeral eight cross-section with two lobes, disposed adjacently, and may be of the type described in U.S. Pat. No. 3,189,679. However, the insulation sheath has been modified from the one in the patent so that a sheath 82 used herein is provided with a flat surface 83 to insure that an open slit 84 thereon is always directed downwardly.

Having described my invention with several types of conductors, one skilled in the art, after studying the above disclosure, could devise other embodiments of my invention without departing from the spirit and scope thereof. Therefore, my invention is not to be considered to be limited to the described embodiments, but includes all embodiments which fall within the scope of the appended claims.

I claim:

1. An overhead support for a multi-conductor trolley system comprising:
    a plurality of conductor sections, each having an insulation sheath substantially covering each respective section;
    each of said sheaths having an axially parallel slit formed thereon;
    a pair of insulating bar means, each fixed in spaced apart relationship to each one of said conductor sections, so that said conductor sections are disposed substantially parallel and the open slit of each sheath is disposed opposite said bar means, forming a conductor sub-assembly unit;
    at least two mounting means, each fixed in spaced apart relationship and disposed overhead;
    each of said bar means and the respective ones of said mounting means, each including securing means for securing the two together.

2. The support of claim 1 wherein:
    a U-shaped insulation sheath disposed over each conductor section so that the open slit thereof is axially parallel with the respective conductor section; and each of said mounting means comprises:
    a pair of spaced depending flanges disposed transversely to said conductor sections;
    a pair of pins, each extending through suitable openings in each flange, one at each end.

3. The support of claim 2 wherein each of said bar means comprises:
    an elongated bar member disposed transversely to said conductor sections and having ends extending outwardly on opposite sides of said plurality of conductor sections, said ends being capable of being supported by said pins.

4. The support of claim 3 wherein:
    said bar member has a plurality of counter-bored holes in line between said ends;
    a bolt is disposed within each one of said counter-bored holes for gripping a respective conductor section.

5. The support of claim 3 wherein:
    said pins have a toggle formed at one end so that said pins can be readily removed from said flanges;
    said bar member has a groove formed at each end and disposed substantially parallel to said conductors so that the respective pin is capable of being disposed therein when said bar means and said mounting means are secured together.

6. The support of claim 5 wherein:
    the distance between said flanges being greater than the width of the respective one of said bar members to allow said bar member to slide along said respective pins.

7. The support of claim 5 wherein:
    said bar member has a plurality of counter-bored holes in line between said ends;
    a bolt is disposed within each one of said counter-bored holes for gripping a respective conductor section.

8. The support of claim 7 wherein:
    the distance between said flanges being greater than the width of the respective one of said bar members to allow said bar member to slide along said respective pins.

9. The support of claim 1 wherein:
    said conductor sections have a cross-section in the shape of a numeral seven, with a planer portion disposed adjacent said bar means, and curved surfaces opposite thereof;
    said insulation sheaths have internal cross-sections to conform substantially to respective ones of said conductor sections with said curved surface disposed internally of said slit.

10. The support of claim 1 wherein:
    said conductor sections have a ring-shaped cross-section;
    said insulation sheaths have internal cross-sections to conform substantially to respective ones of said conductor sections and have external cross-sections whereon a respective planer surface is formed opposite said slit.

11. The support of claim 1 wherein:
    each of said conductor sections has a numeral eight cross-section with two lobes disposed parallelly;
    each of said insulation sheaths has an internal cross-section to conform with the external cross-section of said conductor's cross-section, and disposed so that a portion of one lobe is accessible through said slit;
    each of said insulation sheaths has a planer surface formed opposite said slit.

12. The support of claim 1 wherein each of said bar means comprises:
    an elongated bar member disposed transversely to said conductor sections and having ends extending outwardly on opposite sides of said plurality of conductor sections, said ends being capable of being supported by said pins.

13. The support of claim 1 wherein:
    said bar member has a plurality of counter-bored holes in line between said ends;
    a bolt is disposed within each one of said counter-bored holes for gripping a respective conductor section.

* * * * *